United States Patent [19]

Hagan

[11] Patent Number: 4,660,748

[45] Date of Patent: Apr. 28, 1987

[54] INTEGRAL SYPHON PACKAGE HEAD

[75] Inventor: Richard J. Hagan, San Carlos, Calif.

[73] Assignee: McKesson Corporation, Los Angeles, Calif.

[21] Appl. No.: 687,296

[22] Filed: Dec. 28, 1984

[51] Int. Cl.[4] .................... B22D 37/00; B65D 47/10; F16K 31/00; B67C 3/00

[52] U.S. Cl. .................................. 222/509; 222/518; 222/541; 222/543; 251/291; 251/331; 141/15

[58] Field of Search ............... 222/399, 543, 510, 505, 222/517, 511, 541, 518, 509, 546, 402.24, 213, 518, 501, 559, 472, 192, 394; 251/291, 244, 243, 342, 61.1; 331; 220/67, 355, 4 B; 141/15

[56] References Cited

U.S. PATENT DOCUMENTS

| | | | |
|---|---|---|---|
| 1,099.925 | 6/1914 | Kleinfeldt et al. | 222/399 |
| 2,830,745 | 4/1958 | Aicart | 222/402.15 |
| 2,863,699 | 12/1958 | Elser | 222/402.24 |
| 3,101,876 | 8/1963 | Ayres | 222/509 X |
| 3,342,365 | 9/1967 | Lux et al. | 220/4 B |
| 3,758,000 | 9/1973 | Mack | 222/562 X |
| 3,863,673 | 2/1975 | Sitton | 222/511 X |
| 3,949,903 | 4/1976 | Benasutti et al. | 222/509 X |
| 4,356,926 | 11/1982 | Priestly et al. | 220/67 |
| 4,368,832 | 1/1983 | Lambert | 222/509 |
| 4,387,819 | 6/1983 | Corsette | 222/546 X |
| 4,502,618 | 3/1985 | Bushell | 222/509 X |

FOREIGN PATENT DOCUMENTS

| | | | |
|---|---|---|---|
| 77139 | 11/1948 | Czechoslovakia | 222/509 |

*Primary Examiner*—F. J. Bartuska
*Assistant Examiner*—Gregory L. Huson
*Attorney, Agent, or Firm*—Flehr, Hohbach, Test, Albritton & Herbert

[57] ABSTRACT

A syphon head (10) is configured to fit over neck (17) of a bottle (19) in sealing relationship. A lever (22) is mounted to exterior surface (13) of body (12) by breakaway filaments (26, 28) and a spring strip (30). In use, the user pulls upward on handle (80) of lever (22) to rupture the filaments (26, 28). The strip (30) pivots end (48) on lever (22) through opening (78) in body (12) and into cavity (46) in actuating rod (38). Actuating rod (38) is attached to interior surface (20) of the body (12) by resilient diaphragm (40). Rod tip (57) seals opening (59) in syphon tube (56) until force on handle (80) moves rod (38) to allow dispensing of seltzer water (76). Head (10) may be fabricated in a single injection molding step.

36 Claims, 15 Drawing Figures

INTEGRAL SYPHON PACKAGE HEAD

CROSS-REFERENCE TO RELATED APPLICATIONS

This application and and copending applications by Richard J. Hagan, Ser. No. 06/609,280, now abandoned, May 10, 1984 and entitled "METHOD AND APPARATUS FOR STORING AND DISPENSING FLUIDS CONTAINERED UNDER GAS PRESSURE", and Ser. No. 06/635,450, filed July 31, 1984 and entitled "SYPHON ASSEMBLY AND PACKAGE INCORPORATING THE ASSEMBLY", are directed to related inventions.

BACKGROUND OF THE INVENTION

1. Field of the Invention

This invention relates to an improved closure especially configured for fabrication in a single molding step. More particularly, it relates to such a closure that is tamper-proof prior to actuation by an end user.

The first related application discloses an apparatus incorporating a syphon head for dispensing seltzer water and other liquids stored under pressure. In the apparatus there disclosed, a recyclable or disposable container with the liquid under pressure is provided for use with a reusable syphon head. A conventional closure is removed from the container at the time the syphon head is installed on the container. Since the pressure is not applied to the closure, its removal and replacement with the syphon head does not disturb the pressurized liquid. Actuation of the syphon head opens a valve provided in an insert of a necked opening in the container to discharge the pressurized liquid from the container.

The second related application provides a valve structure that is substantially simpler in construction than the structure described in the first related application. The valve and syphon head disclosed in the second related application can therefore be easily fabricated in high volume at low cost.

2. Description of the Prior Art

The substantial prior art on syphon seltzer bottle technology is summarized in the related application. Briefly, conventional seltzer bottles are provided with syphon heads that remain permanently with the bottle. The head and bottle assembly is refilled with seltzer water under pressure for each use. The seltzer bottles and syphon head assemblies are of heavy duty, rugged construction in order to provide strength against the substantial gas pressures of up to 10 atmospheres employed in such seltzer bottles, and also to allow reuse of the syphon head-bottle combination for many years.

The first related application provides, for the first time, an apparatus and method in which the seltzer or other liquid may be packaged under such substantial gas pressure in a recyclable or disposable container. The second related application allows low cost, high volume manufacture and filling of such containers. Further improvement in the packages of those designs is desirable for additional cost reduction and consumer appeal.

SUMMARY OF THE INVENTION

Accordingly, it is an object of this invention to provide an integrally formed package closure incorporating a valve actuating mechanism.

It is another object of the invention to provide such a closure which is tamper-resistant until activation by the end user.

It is yet another object of the invention to provide such a closure in which positioning of a part of the closure for activation is self guiding.

It is another object of the invention to provide such a closure in which part of the closure that provides the self guiding function also helps bias the closure valve in a sealed position when not in use.

It is a further object of the invention to provide such a closure which is sufficiently low in cost that it may be recycled or discarded after discharge of a single filling of the package.

It is a still another object of the invention to provide such a container closure especially adapted for use as a syphon head for release of beverages and other liquids stored under gas pressures of up to about 10 atmospheres.

The attainment of these and related objects may be achieved through use of the novel container closure and package incorporating the container closure herein disclosed. A container closure in accordance with this invention is a head configured to fit over a necked opening of a container in sealing relationship. There is a valve actuating means in the head. A lever for operative engagement of the valve actuating means has a first end and a second end. The lever is integrally formed with the head and is attached to an exterior surface of the head by at least one break away member. The head has a first opening for insertion of the first lever end operatively to engage the valve actuating means. The lever is configured so that the second lever end extends through the head opening for application of actuating force in a given direction by a user when the first lever end operatively engages the valve actuating means.

In a preferred form of the invention, the lever is further permanently attached to the exterior surface of the head by a resilient biasing member, which is configured to apply biasing force in opposition to the actuating force in the given direction. The resilient biasing member is preferably further configured to pivot the first lever end through the first opening into operative engagement with the valve actuating means when the break away member is broken away. The valve actuating means also preferably comprises an upwardly extending rod having a first end with a transversely extending opening configured to receive the first lever end. The rod has a second, valve sealing end. The rod is attached to an interior surface of the head by a resilient diaphragm, and the resilient diaphragm is configured to apply biasing force to the rod in opposition to the actuating force. The rod and diaphragm may be integrally formed with the head. In this form, the container closure of the invention is formed as one piece, including the lever attached to the exterior surface of the head, and the resilient diaphragm and rod assembly attached to the interior surface of the head.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Figure 1:
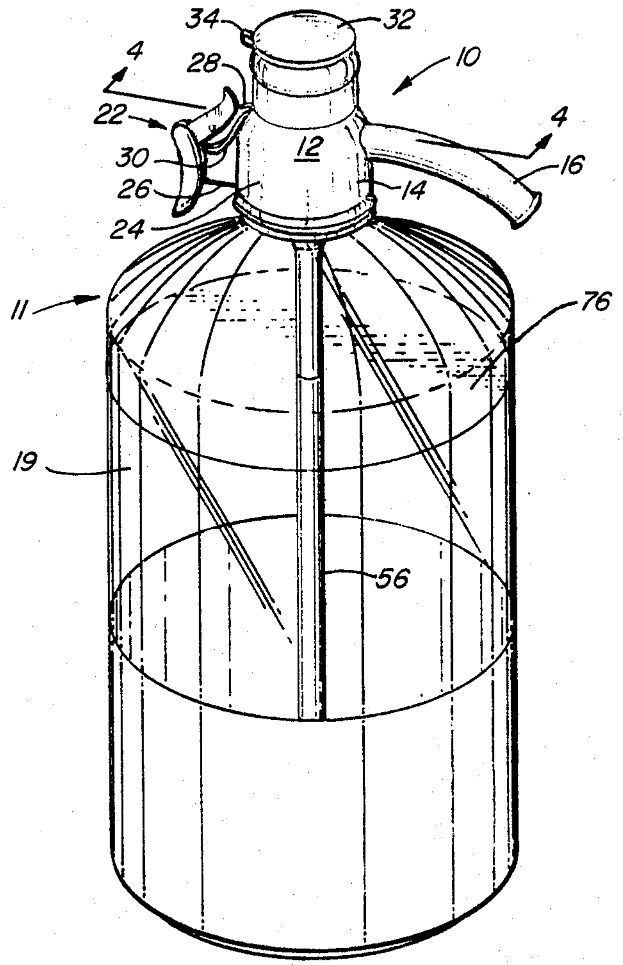
FIG. 1 is an external perspective view of a syphon head and package in accordance with the invention.
Figure 2:
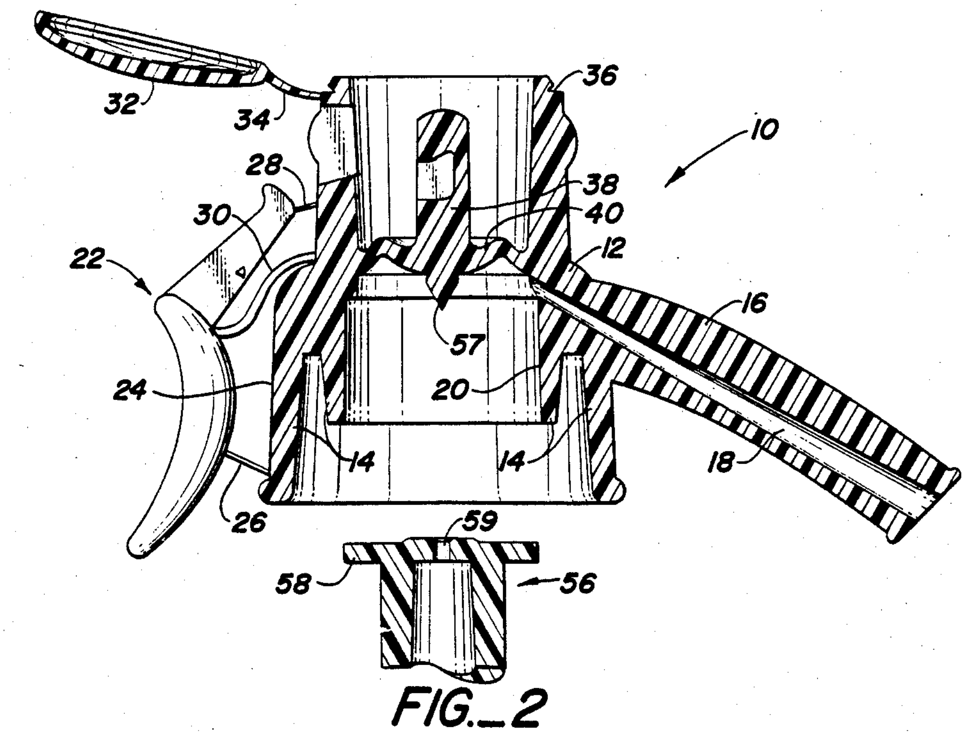
FIG. 2 is a cross-section view of the syphon head in FIG. 1, but during the process of fabrication.

Turning now to the drawings, more particularly to FIGS. 1–4, there is shown a syphon head closure 10 in accordance with the invention. The head 10 includes a body 12 with tapered flanges 14 for attachment to both inside surface 13 and outside surface 15 of neck 17 of plastic bottle 19 (FIG. 3) by spin or ultrasonic welding. A spigot 16 incorporates a passageway 18 through the body 12, communicating with interior surface 20 of the body 12. An actuating lever 22 is attached to exterior surface 24 of the body 12 by first and second break away filaments 26 and 28 and by a thicker, resilient biasing ribbon 30. A top 32 is attached to the body 12 by flexible hinge 34. The top 32 is configured to fit flange 36 of the body 12 in a snap fit. An upwardly extending actuating rod 38 constituting a valve actuating means is centrally disposed within body 12, and is attached to interior surface 20 of the body 12 by a resilient, flexible diaphragm 40. The diaphragm 40 divides the head 12 into an upper chamber 42 and a lower chamber 44. Actuating rod 38 has a cavity 46 extending into the rod 38 and dimensioned to receive end 48 of the lever 22.

In practice, all of the parts of the head closure 10 are preferably fabricated together from a suitable plastic material in a single molding step. For this purpose, an injection molded co-polyester plastic is preferably employed. The body 12, lever 22, cap 32 and spigot 16 are formed by a one piece mold cavity, with separate cores from above into upper chamber 42, from below into lower chamber 44 and from the side to form the rod 38, flexible diaphragm 40 and the passageway 18. A slider within the core used to form spigot 16 forms the passageway 18.

Figure 3:
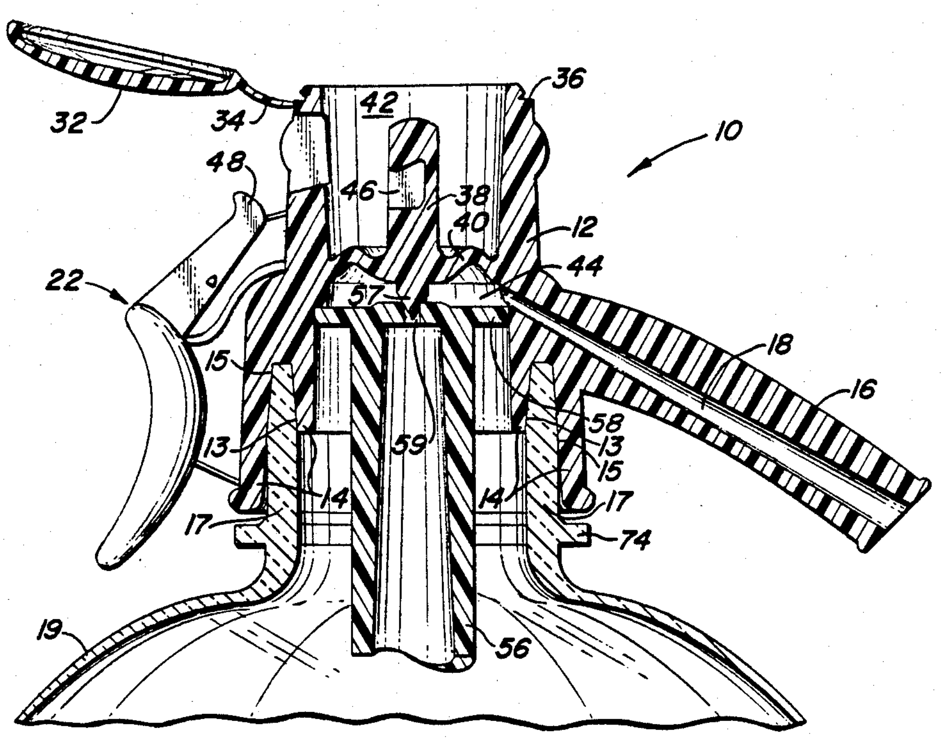
FIG. 3 is cross-section view similar to that of FIG. 2, but showing the syphon head of FIG. 2 in place on a container prior to filling.
Figure 4:
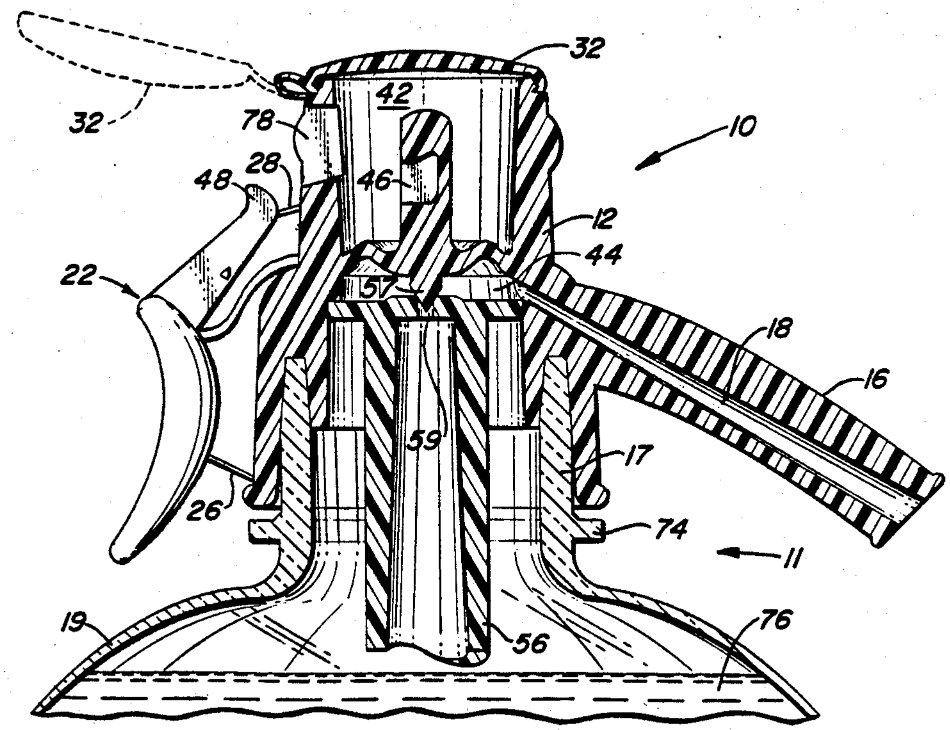
FIG. 4 is a cross section view taken along the line 4—4 in FIG. 1.

Prior to attachment of the body 12 to a container, the syphon tube 56 is attached to the inside surface 20 of the body 12, by spin or ultrasonic welding the flange 58 in place. (See FIGS. 2 and 3). Tip 57 of rod 38 engages opening 59 of tube 56 in a sealing fit when tube 56 is in place. After the syphon tube 56 is attached in the body 12, the top 32 is snapped into position in flange 36, as shown in FIG. 4. FIGS. 3 and 4 show closure 10 in place on neck 17 of a plastic bottle 19, permanently attached by welding. Flange 74 extending around the neck of the bottle 17 provides support for the body 12 against lateral shearing forces, such as might occur if the bottle 19 were dropped. The bottle 19 is filled with highly carbonated water 76 through spigot 16, as is conventional in seltzer bottling, by inserting a suitable member through opening 78 in body 12 to engage rod 38 to apply force for moving end 57 of the rod away from opening 59, thus opening the valve assembly and allowing the highly carbonated water 76 to flow into the bottle 19. This procedure is explained more fully below in connection with FIG. 11. When so filled, the bottle 19 is stored, shipped and sold in the form shown in FIG. 4. Since lever 22 must be inserted through opening 78 to engage the rod 38 to discharge the highly carbonated water 76 from the bottle 19, the presence of intact break away filaments 26 and 28 on the package assures the user that the package 11 has not been tampered with prior to sale. If desired, a removable label or other sealing strip may also be placed over the opening 78 during storage and shipment of the package 11.

Figure 5:
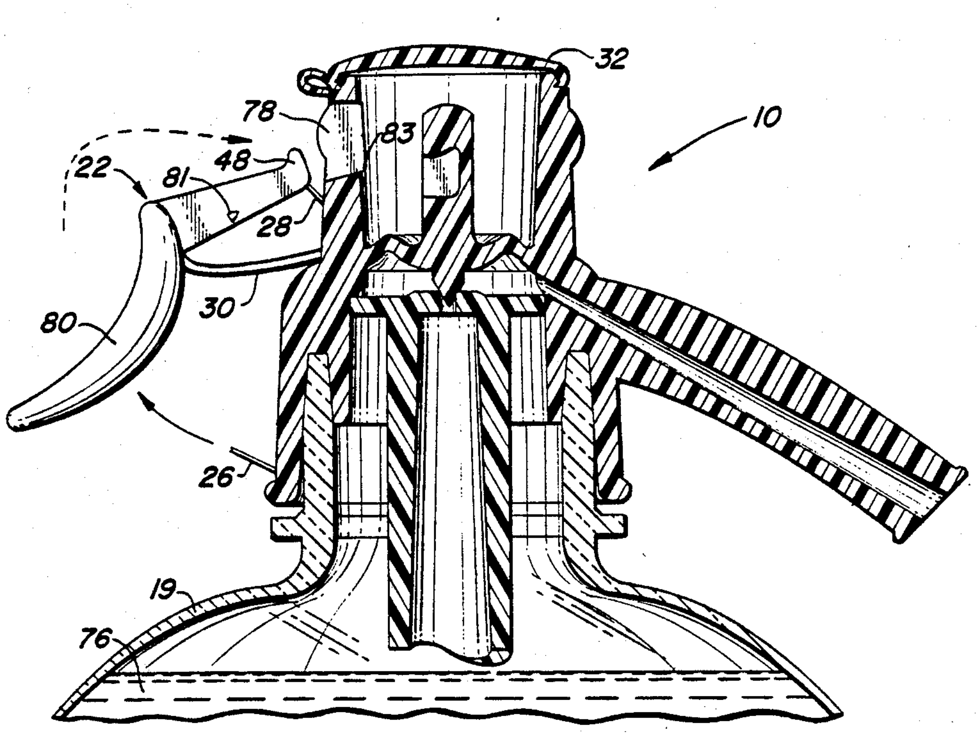
FIG. 5 is a cross-section view of the syphon head and package shown in FIGS. 1 and 4 during activation.
Figure 6:
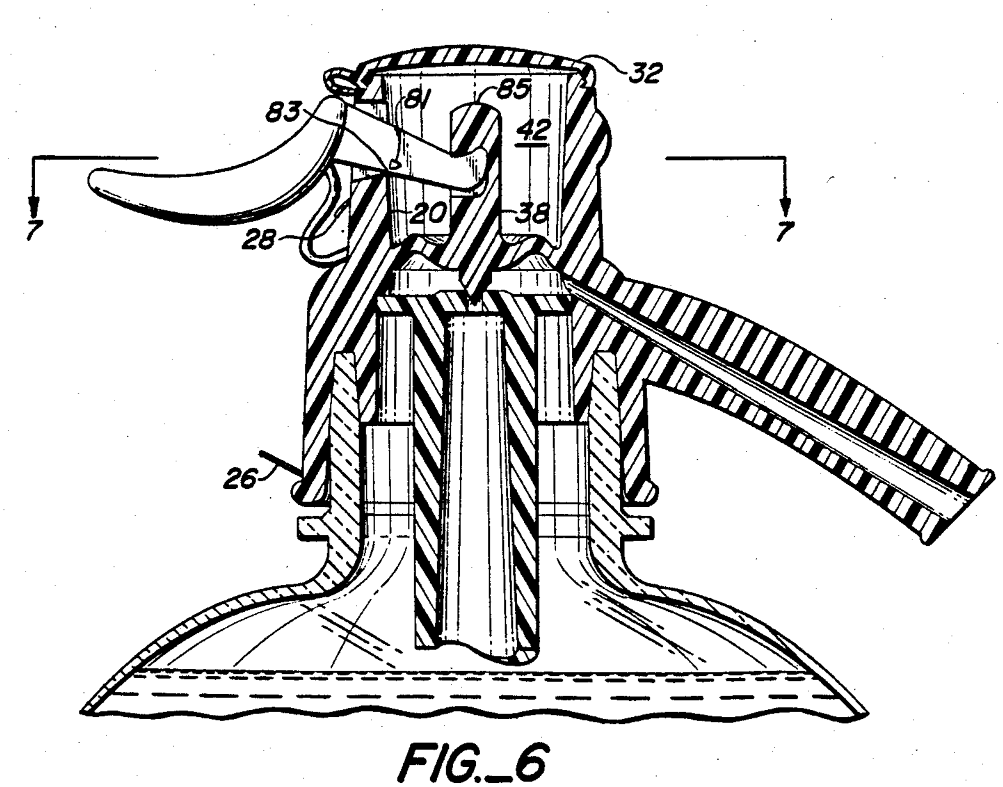
FIG. 6 is a cross-section view of the syphon head and package shown in FIGS. 1 and 4–5 after activation.
Figure 7:
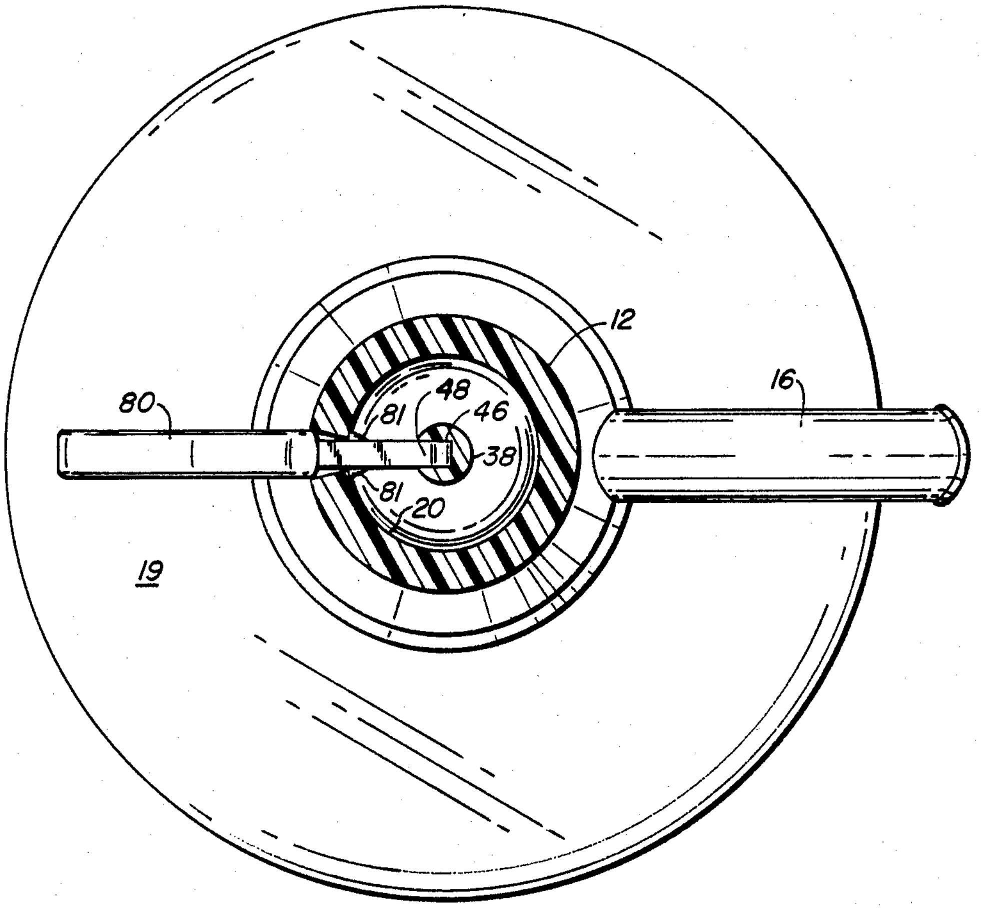
FIG. 7 is a top cross section view taken along the line 7—7 in FIG. 6.

FIG. 5 shows the syphon head closure 10 during the process of activating the syphon head closure for dispensing the seltzer 76 from bottle 19 by insertion of the lever 22 through opening 78. The user pulls upward on the lever handle 80, first rupturing the filament 26. Spring strip 30 guides the lever 22 with continued upward force on the handle 80, so that end 48 of the lever 22 enters the opening 78. The second break away filament 28 breaks during this travel. The spring strip 30 is configured so that it will guide the end 48 into cavity 46 in rod 38 to give the configuration shown in FIGS. 6 and 7. Nipples 81 on either side of the lever 22 engage inside surface 20 of the upper chamber 42 to keep the lever 22 in place once it has been inserted through opening 78 (see FIG. 7). Edge 83 of opening 78 serves as a fulcrum for raising rod 38 when downward force is applied to handle 80.

Figure 8:
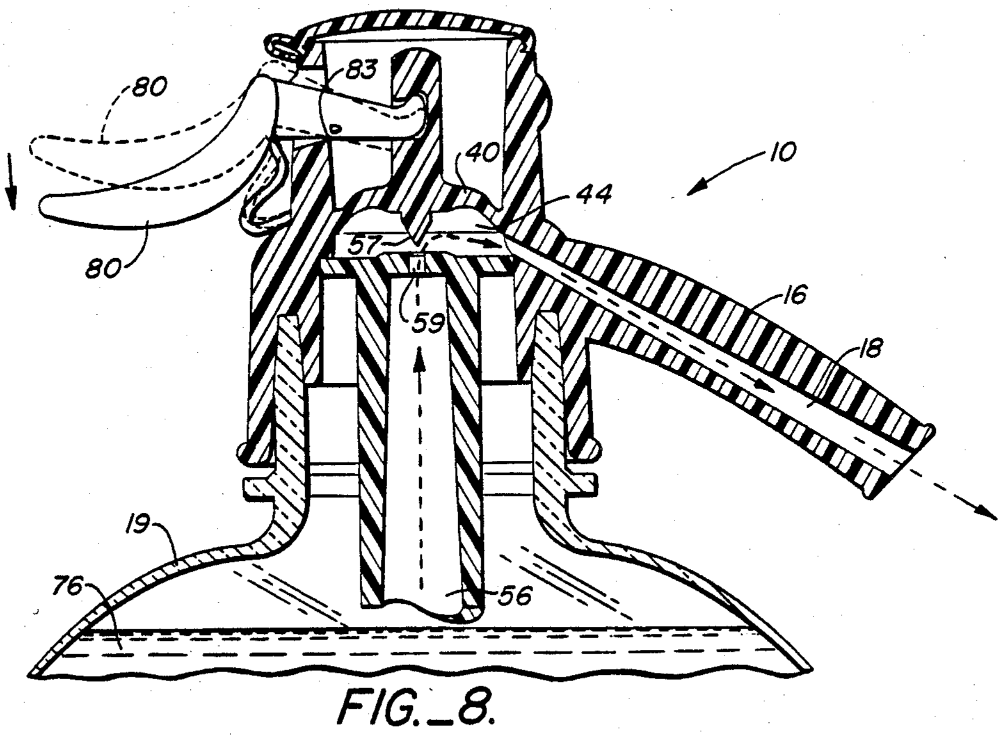
FIG. 8 is a cross-section view of the syphon head and package shown in FIGS. 1–7 during use.

FIG. 8 shows the syphon head closure 10 actuated by a user. Downward force on the handle 80 of the lever 22 is converted to upward force on the rod 38 by fulcrum edge 83, thus moving tip 57 out of sealing engagement with opening 59 in the syphon tube 56. The seltzer water 76 is then discharged by the carbon dioxide pressure in bottle 19 through opening 59 into lower chamber 44 and out passageway 18 of spigot 16. When the user releases the downward force on handle 80 of lever 22, the downward biasing force of diaphragm 40 on rod 38 returns the head closure 10 to the position shown in FIG. 6, with tip 57 sealing the opening 59. If desired, a compressed spring can be inserted between end 85 of rod 38 and top 32, and top 32 bonded in place, to provide additional downward biasing force on rod 38. When the bottle 19 is empty, it and the head closure 10 are recycled or discarded.

Figure 9:
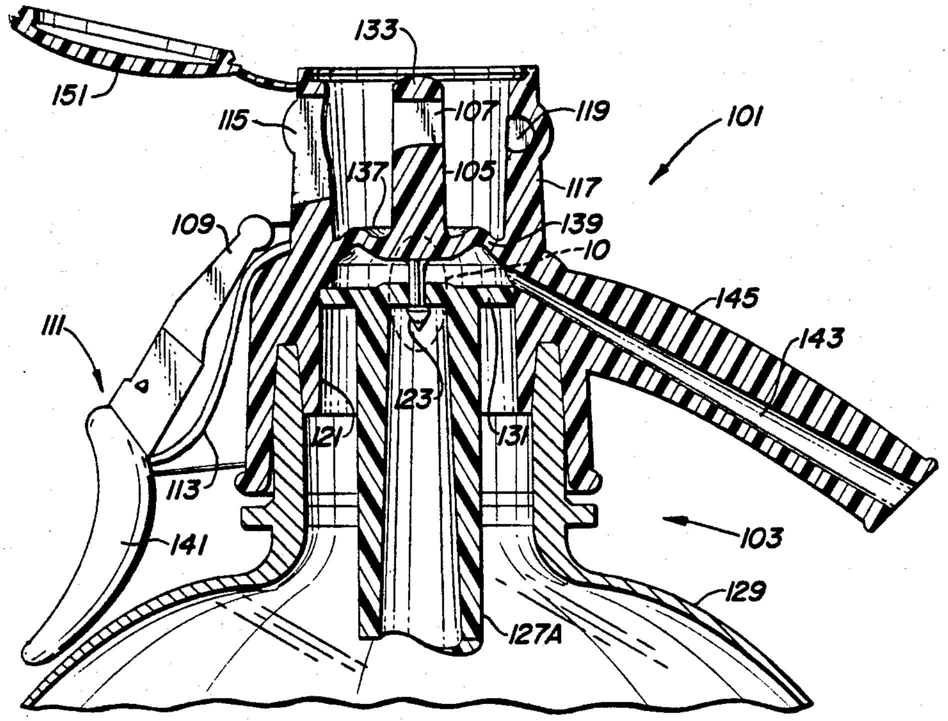
FIG. 9 is a cross section view similar to that of FIG. 3 of another embodiment of a syphon head and package in accordance with the invention.
Figure 10:
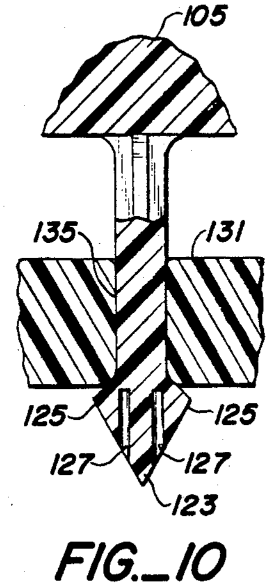
FIG. 10 is an enlarged version of the area 10 shown in FIG. 9.
Figure 11:
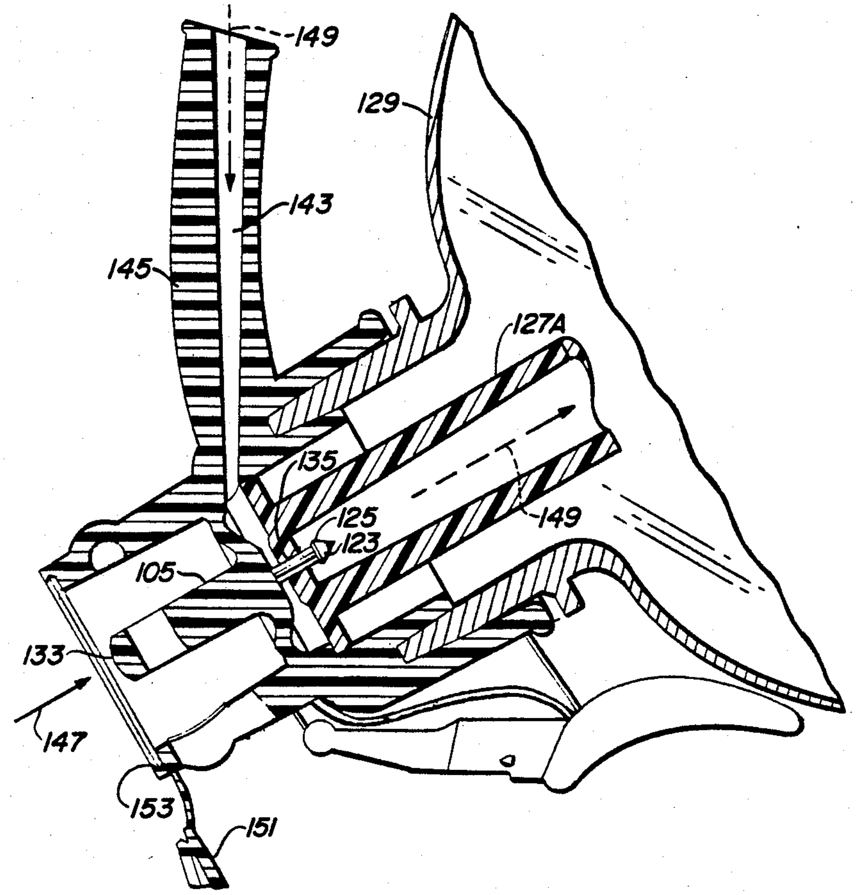
FIG. 11 is a cross section view of the syphon head and package of FIG. 9, but during filling.

FIGS. 9–11 show another form of a syphon head 101 and package 103 in accordance with the invention. In this syphon head 101, actuating rod 105 has an aperture 107 passing transversely through the rod and dimensioned to receive end 109 of lever 111. Spring strip 113 is configured so that it will guide the end 109 of lever 111 through opening 115 in body 117, aperture 107 in rod 105 and into engagement with socket 119 in interior surface 121 of the body 117. Rod 105 has a pointed tip 123, best shown in FIG. 10, which flares outward at 125. A plurality of slots 127 near the tip 125 allows the flared portion 125 to be deformed inward during attachment of rod 105 to a syphon tube 127A. With the lever 111 in actuating position, the spring strip 113 is looped to provide an upward biasing force on the lever 111. This biasing force cooperates with the upward biasing force applied by diaphragm 139 on the rod 105. These two biasing forces insure that the flared portion 125 of the rod tip 123 remains seated against opening 135 in the syphon tube 127A. Prior to attachment of the body 117 to the bottle 129, the syphon tube 127A is attached to the inside surface 121 of the body 117, by spin or ultrasonic welding the flange 131 in place. During this operation, the rod 105 is supported at its upper end 133, so that the flared portion 125 of tip 123 will deform inward and pass through centrally disposed opening 135 in the syphon tube 127A. After the flared portion 125 deforms to pass through the opening 135, it resumes its normal shape, thus forming a sealing surface against the opening 135. Bend 137 in the resilient diaphragm 139 provides spring tension in the diaphragm, providing an upward biasing force on the rod 105 to maintain the flared portion 125 in sealing engagement with the opening 135.

In operation, the user inserts the lever end 109 through opening 115, aperture 107 and into socket 119 in a similar manner as described above with respect to FIGS. 5 and 6. However, unlike as in FIG. 6, the fulcrum of lever 111 is the socket 119, so that rod 105 moves downward when downward force is applied to handle 141, thus moving flared portion 125 of rod tip 123 away from opening 135 (see FIG. 11) to discharge the seltzer water from bottle 129 through passageway 143 in spigot 145.

FIG. 11 shows how the package 103 is filled with seltzer water. As is conventional for filling seltzer bottles, the bottle 129 is oriented so that passageway 143 in spigot 145 extends vertically upward. Force is applied by a suitable member on the filler to upper end 133 of the rod 105 as shown by arrow 147, thus moving flared portion 125 of rod tip 123 out of sealing engagement with opening 135. The seltzer water then enters the bottle 129 through the passageway 143 and syphon tube 127A, as shown by arrows 149. After filling, cap 151 is closed to engage flange 153, and the package 103 is ready for shipment and sale. Other than as shown and described above, the construction and operation of the FIGS. 9–11 embodiment is the same as the FIGS. 1–8 embodiment.

Figure 12:
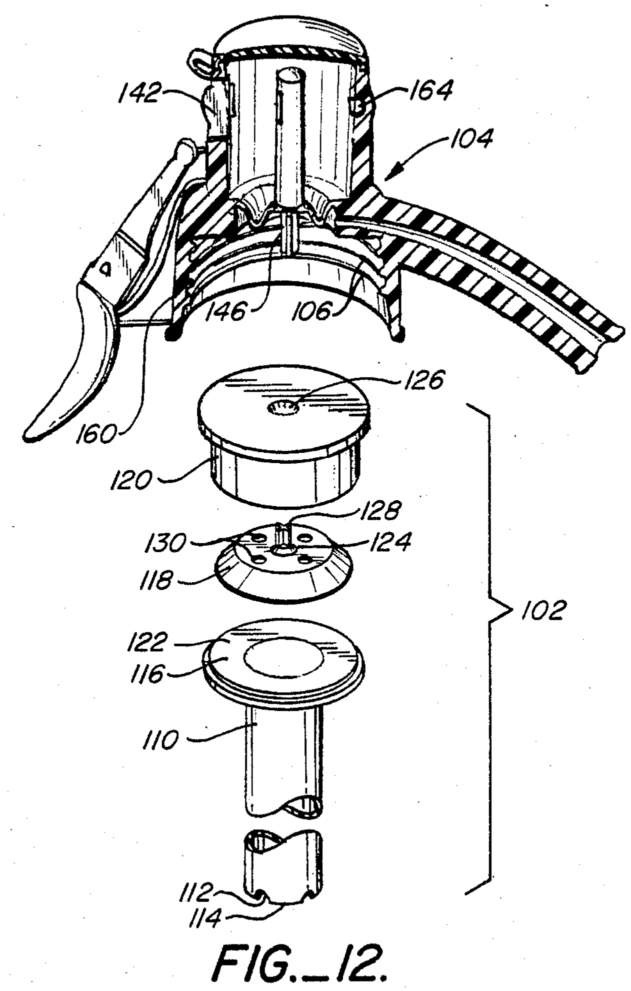
FIG. 12 is an exploded perspective and partial section view of another syphon head and package embodiment in accordance with the invention.
Figure 13:
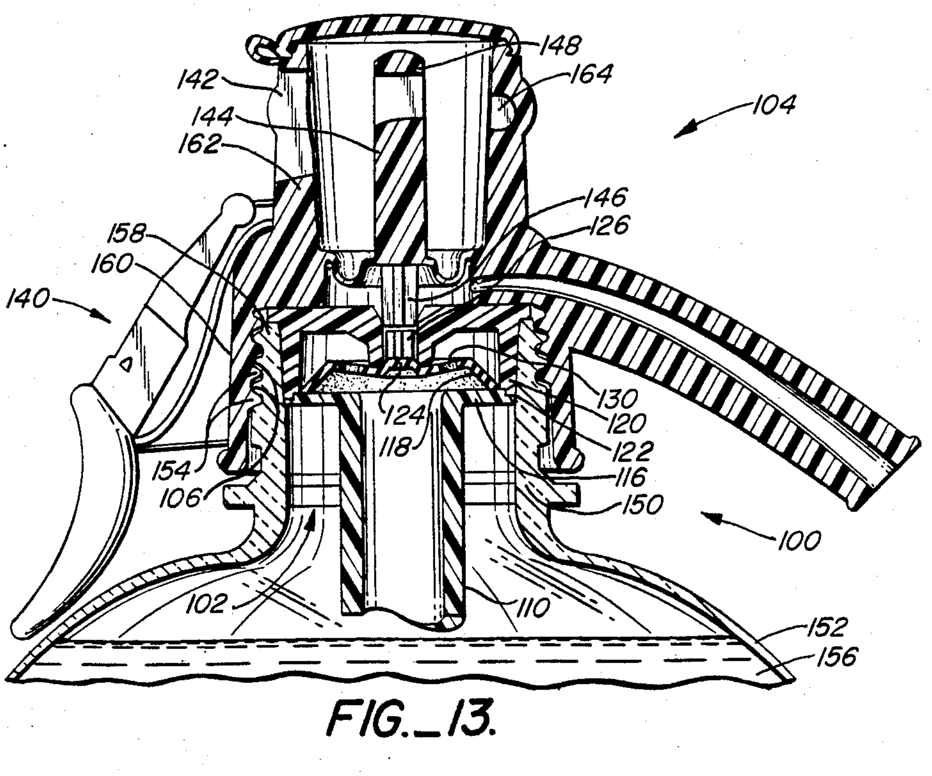
FIG. 13 is a cross section view of a completed package incorporating the syphon head of FIG. 12.

FIGS. 12 and 13 show a third embodiment of a package 100 in accordance with the invention. This package 100 includes an insert assembly 102 comprising a normally closed valve, which is inserted in the neck 150 of a bottle 152, and a head closure 104, which is screwed by threads 106 onto mating threads on the neck of the bottle. With this embodiment, the bottle 152 containing the seltzer water 156 is sold with the insert assembly 102 in place in the neck of the bottle and a conventional aluminum twist off or plastic snap on cap fastened over the neck of the bottle. The end user replaces the cap with the head closure 104.

The insert assembly 102 includes a tube 110 which extends from the neck 150 of the bottle into the seltzer water 156 and to the bottom of the bottle 152. Openings 112 are provided at end 114 of the tube 110 to allow the seltzer water to enter the tube 110. The tube 110 has a flanged upper end 116 within the neck of the bottle. A resilient, substantially frustoconical shaped valve sealing member 118 rests on end 116 of the tube 110. Insert 120 fits over the valve sealing member 118 and is bonded to edge 122 of the tube end 116. The tube end 116 and insert 120 are both bonded in sealing engagement to interior surface 158 of the bottle neck. Valve sealing member 118 has a raised portion 124, which normally seals centrally disposed passageway 126, which extends through the insert 120. A cruciform cross section valve guide 128 extends upward from the raised portion 124 into the passageway 126. Openings 130 are provided around the raised portion 124 through the valve sealing member 118.

As in the FIGS. 9–11 embodiment, the head 104 has a lever 140, mounted on exterior surface 160 of head body 162. To activate the head 104, lever 140 is extended through an opening 142 operatively to engage a vertically disposed actuating rod 144. The actuating rod 144 serves as a valve actuating means, with its lower end engaging the valve. Cruciform cross section end 146 of the rod 144 is configured to engage the valve guide 128 of the normally closed valve formed by the insert assembly 102 and apply valve actuating force to the valve guide 128 to open the valve.

The head 104 is provided separately from the seltzer water package 100 including the insert assembly 102 and a conventional aluminum twist off or plastic snap on cap. After replacing the cap with the head 104, the user separates lever 140 from body 162 of the head 104 in the same manner as in the FIGS. 9–11 embodiment, to insert the lever 140 through opening 142, aperture 148 extending transversely through rod 144 and into socket 164. When the seltzer package is empty, the user may remove the head 104 for use with another seltzer package. Other than as shown and described above, the construction and operation of the FIG. 13 embodiment is the same as the FIGS. 9–11 embodiment.

Figure 14:
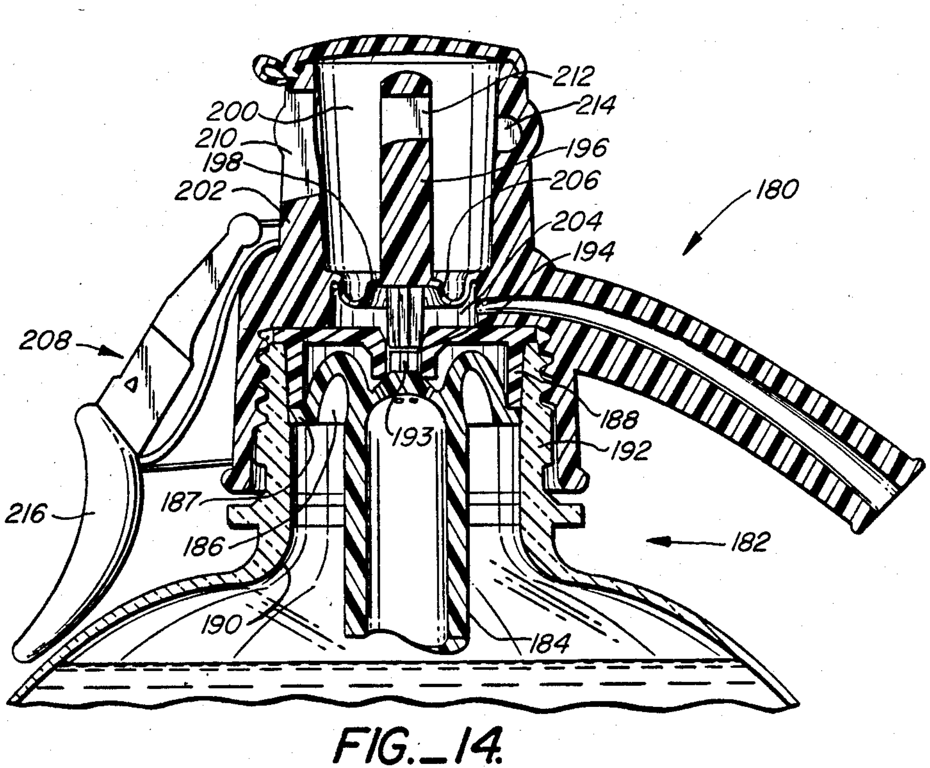
FIG. 14 is a cross section view of another syphon head and package embodiment in accordance with the invention.

FIG. 14 shows a fourth embodiment of a syphon head 180 and package 182 in accordance with the invention. In this embodiment, syphon tube 184 is formed from a more resilient plastic material than the syphon tubes of the previous embodiments. Flanged end 186 of the tube 184 flexes to provide the valve action in this package 182. Flanged end 186 is bonded at its edge 187 to insert 188, which is in turn spin welded to interior surface 190 of bottle neck 192. Rod 193 is integrally formed with the flange 186 of tube 184 and extends through centrally disposed aperture 194 through insert 188. Flange 186 biases the rod 193 in sealing engagement against the aperture 194. Upper rod 196 extends upward from diaphragm 198, and is centrally disposed in upper chamber 200 of head 180. The upper rod 196 and diaphragm 198 are integrally formed with body 202 of the head 180. The diaphragm 198 separates the body 202 into the upper chamber 200 and a lower chamber 204. Bend 206 in the diaphragm 198 serves to bias the upper rod 196 upward. When the head 180 is activated, lever 208 extends through opening 210 in body 202, aperture 212 in upper rod 196 and into socket 214, as in the FIGS. 9–13 embodiments.

In operation, downward force on handle 216 displaces lower rod 193 out of sealing engagement with aperture 194, due to downward flexing of the diaphragm 198 and flange 186 to dispense seltzer water from the package 182. Other than as shown and described, the construction and operation of the FIG. 14 embodiment is the same as the FIGS. 12–13 embodiment.

Figure 15:
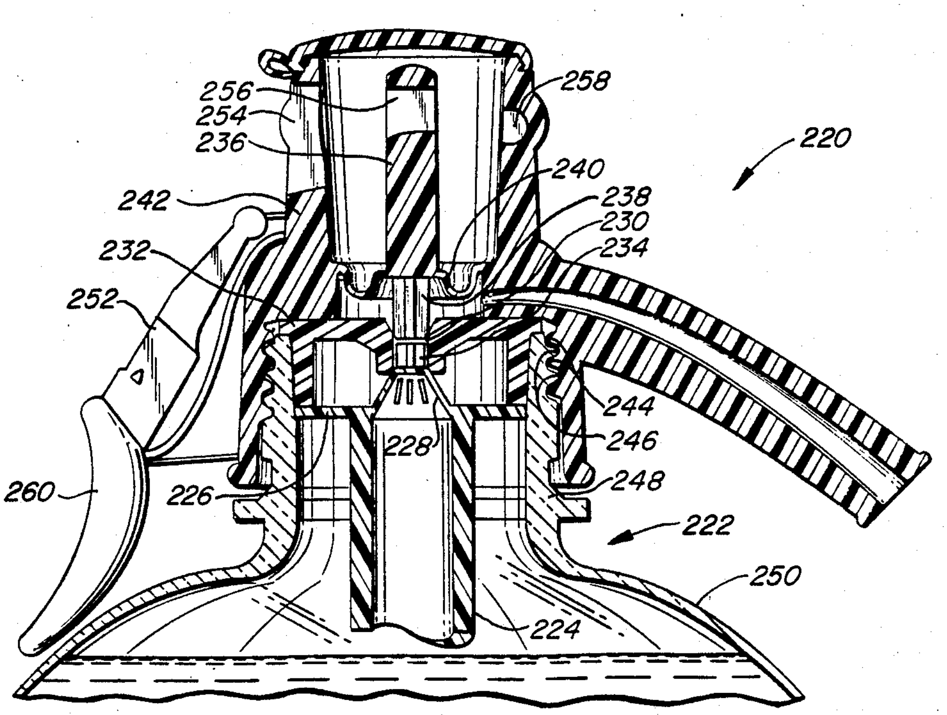
FIG. 15 is a cross section of still another syphon head package embodiment in accordance with the invention.

FIG. 15 shows a fifth embodiment of a syphon head 220 and package 222 in accordance with the invention. In the package 222, tube 224 is formed from a resilient plastic material, as in the FIG. 14 embodiment. Flange 226 of the tube 224 has a centrally disposed, integrally formed cone valve member 228 extending upward to engage centrally disposed aperture 230 in insert 232. A cruciform cross section valve guide portion 234 of the cone valve member 228 extends into the opening 230. Actuating rod 236 has a cruciform cross section lower portion 238 extending from above into the aperture 230. The actuating rod 236 and diaphragm 240 are integrally formed with body 242 of the syphon head 220. Body 242 is screw threaded at 244 for attachment to mating threads 246 on neck 248 of bottle 250.

In operation, the syphon head 220 is activated by insertion of lever 252 through opening 254 in body 242, aperture 256 in rod 236 and into socket 258 in body 242, in the same manner as the FIGS. 12–14 embodiments. Downward force on handle 260 of lever 252 displaces the cone valve member 228 out of sealing engagement with opening 230 to allow discharge of seltzer water from the package 222. Other than as shown and described, the construction and operation of the FIG. 15 embodiment is the same as the FIGS. 12–14 embodiments.

It should now be readily apparent to those skilled in the art that a novel container closure and syphon assembly incorporating the container closure capable of achieving the stated objects of the invention has been provided. The heads 10, 101, 104, 180, and 220 may be fabricated in a single injection molding step. When sold as part of a completed package, the attachment of the actuating levers to the bodies of the heads with the break away filaments allows the purchaser to determine if the package has been tampered with prior to sale. The container closure and syphon assembly of this invention further reduces cost in high volume fabrication.

It should further be apparent to those skilled in the art that various changes in form and details of the invention as shown and described may be made. It is intended that such changes be included within the spirit and scope of the claims appended hereto.

What is claimed is:

1. A container closure comprising a head having a body configured to fit over a necked opening of a container in sealing relationship, a valve actuating means in said body, and a lever for operative engagement of said valve actuating means, said lever having a first end and a second end and being integrally formed with said body, said lever being attached to an exterior surface of said body by at least one break away member, said body having a first opening for insertion of the first lever end operatively to engage said valve actuating means after rupture of said at least one break away member, said lever being configured so that the second lever end extends through the first opening in said body for application of actuating force in a given direction by a user when the first lever end operatively engages said valve actuating means.

2. The container closure of claim 1 in which said body is configured to fit over the necked opening of the container by having a pair of flanges configured to extend along an inside surface of the container necked opening and an outside surface of the container necked opening.

3. A package comprising a container having a necked opening with inside and outside surfaces and the closure of of claim 2 with said pair of flanges bonded to the inside and outside surfaces of the necked opening of said container.

4. The package of claim 3 in which said container and said closure are formed from plastic material.

5. The container closure of claim 1 in which said body is configured to fit over the container necked opening by having a set of threads configured to mate with matching threads to attach said closure to the necked opening.

6. A package comprising a container having a threaded necked opening and the closure of claim 5 in threaded engagement with the threaded necked opening of said container.

7. The package of claim 6 in which said container is formed from a metal or a plastic material and said closure is formed from a plastic material.

8. A container closure comprising a head having a body configured to fit over a necked opening of a container in sealing relationship, a valve actuating means in said body, and a lever for operative engagement of said valve actuating means, said lever having a first end and a second end and being integrally formed with said body, said lever being attached to an exterior surface of said body by at least one break away member, said body having a first opening for insertion of the first lever end operatively to engage said valve actuating means, said lever being configured so that the second lever end extends through the first opening in said body for application of actuating force in a given direction by a user when the first lever end operatively engages said valve actuating means, said lever being further permanently attached to the exterior surface of said body by a resilient biasing member configured to apply biasing force in opposition to the actuating force in the given direction.

9. The container closure of claim 8 in which said resilient biasing member is further configured to pivot the first lever end through the first opening into operative engagement with said valve actuating means when the breakaway member is broken away.

10. The container closure of claim 9 in which said valve actuating means comprises an upwardly extending rod having a first end with a transversely extending opening configured to receive the first lever end and a second valve sealing end, said rod being attached to an interior surface of said body by a resilient diaphragm, said resilient diaphragm being configured to apply biasing force to said rod in opposition to the actuating force.

11. The container closure of claim 10 in which said rod and diaphragm are integrally formed with said body, said body having a top joined to said body by a resilient member, said top being engageable by said body in a closed position over said rod.

12. The container closure of claim 11 in which the transversely extending opening in said rod is a cavity, the first lever end engages the cavity, and downward force on the second lever end moves said rod upward.

13. The container closure of claim 12 in combination with a syphon tube extending downward below said diaphragm, said rod second, valve sealing end extending below said diaphragm with a tip configured to engage an opening in a top of said syphon tube in sealing engagement.

14. The container closure of claim 11 in which the transversely extending opening in said rod extends through said rod, the first lever end passes through said rod, is pivotally attached to the interior surface of said body, and downward force on the second lever end moves said rod downward.

15. The container closure of claim 14 in combination with a syphon tube extending downward from the interior surface of said body below said diaphragm, said rod second, valve sealing end extending below said diaphragm and extending through an opening in a top of said syphon tube, said second rod end having a tip deformable to pass through the opening in said syphon tube top during assembly and being configured for sealing engagement with a lower surface of said syphon tube top.

16. A package comprising the container closure of claim 14, a container having a necked opening, said container closure being removably attachable to the necked opening of said container, an insert comprising a normally closed valve in said necked opening, said normally closed valve having a resilient, deformable member in sealing engagement with a valve opening, said rod second, sealing end extending below said diaphragm and being configured to engage said resilient, deformable member to move said resilient, deformable member out of sealing engagement with said valve opening.

17. A container closure comprising a head having a body configured to fit over a necked opening of a container in sealing relationship, a valve actuating means in said body, means on said body for operative engagement of said valve actuating means, said valve actuating means comprising a rod having a first upwardly extending end configured to receive said means for operative engagement of said valve actuating means and a second, valve engaging end, said rod being attached to an interior surface of said body by a resilient diaphragm, the second, valve engaging end extending downward from said diaphragm and being configured to apply valve actuating force to a valve over which said head is mounted, said resilient diaphragm being configured to apply biasing force to said rod in opposition to the actuating force.

18. The container closure of claim 17 in which said rod and diaphragm are integrally formed with said body.

19. The container closure of claim 17 in which said body is configured to fit over the container necked opening by having a set of threads configured to mate with matching threads to attach said closure to the necked opening.

20. A package comprising a container having a threaded necked opening and the closure of claim 19 in threaded engagement with the threaded necked opening of said container.

21. The container closure of claim 17 in which said body is configured to fit over the necked opening of the container by having a pair of flanges configured to extend along an inside surface of the container necked opening and an outside surface of the container necked opening.

22. A package comprising a container having a necked opening with inside and outside surfaces and the closure of of claim 21 with said pair of flanges bonded to the inside and outside surfaces of the necked opening of said container.

23. The package of claim 22 in which said container and said closure are formed from plastic material.

24. A container closure comprising a head having a body configured to fit over a necked opening of a container in sealing relationship, a valve actuating means in said body, means on said body for operative engagement of said valve actuating means, said valve actuating means comprising an upwardly extending rod having a first end configured to receive said means for operative engagement of said valve actuating means and a second, valve engaging end, said rod being attached to an interior surface of said body by a resilient diaphragm, said resilient diaphragm being configured to apply biasing force to said rod in opposition to the actuating force, said rod and diaphragm being integrally formed with said body, said body having a top joined to said body by a resilient member, said top being engageable by said body in a closed position over said rod.

25. The container closure of claim 24 in which said means for operative engagement of said valve actuating means engages said first rod end such that application of force on said means for operative engagement of said valve actuating means moves said rod upward.

26. The container closure of claim 25 in combination with a syphon tube extending downward below said diaphragm, said rod second, valve engaging end extending below said diaphragm with a tip configured to engage an opening in a top of said syphon tube in sealing engagement.

27. The container closure of claim 24 in which said means for operative engagement of said valve actuating means engages said first rod end such that application of force on said means for operative engagement of said valve actuating means moves said rod downward.

28. The container closure of claim 27 in combination with a syphon tube extending downward from the interior surface of said body below said diaphragm, said rod second, valve engaging end extending below said diaphragm and extending through an opening in a top of said syphon tube, said second rod end having a tip deformable to pass through the opening in said syphon tube top during assembly and being configured for sealing engagement with a lower surface of said syphon tube top.

29. A package comprising the container closure of claim 27, a container having a necked opening, said container closure being removably attached to the necked opening of said container, an insert comprising a normally closed valve in said necked opening, said normally closed valve having a resilient, deformable member in sealing engagement with a valve opening, said rod second, valve engaging end extending below said diaphragm and being configured to engage said resilient, deformable member to move said resilient, deformable member out of sealing engagement with said valve opening.

30. A package comprising a container having a necked opening, a container closure comprising a head having a body configured to fit over the necked opening of said container in sealing relationship, a valve actuating means in said body, means on said body for operative engagement of said valve actuating means, said body being configured to fit over the necked opening of said container, said valve actuating means being integrally formed with said body, said means for operative engagement of said valve actuating means engaging said valve actuating means such that application of force on said means for operative engagement of said valve actuating means moves said valve actuating means downward, said container closure being removably attached to the necked opening of said container, an insert comprising a normally closed valve in said necked opening, said normally closed valve having a resilient, deformable member in sealing engagement with a valve opening, said valve actuating means having a lower end configured to engage said resilient, deformable member to move said resilient, deformable member out of sealing engagement with said valve opening.

31. A package comprising a container having a necked opening with inside and outside surfaces and the closure of of claim 30 with said pair of flanges bonded to the inside and outside surfaces of the necked opening of said container.

32. The package of claim 31 in which the necked opening of said container has a flange extending outward around the outside surface of the necked opening and the closure flange bonded to the outside surface of the necked opening terminates proximate to said container flange.

33. The package of claim 31 in which said container and said closure are formed from plastic material.

34. A package comprising a container having a threaded necked opening, a container closure including a head having a body configured to fit over said container threaded necked opening in sealing relationship, a valve actuating means in said body, means on said body for operative engagement of said valve actuating means, said valve actuating means comprising an upwardly extending rod having a first end configured to receive said means for operative engagement of said valve actuating means and a second, valve sealing end, said rod being attached to an interior surface of said body by a resilient diaphragm, intermediate said first and second ends said resilient diaphragm being configured to apply biasing force to said rod in opposition to the actuating force, said body being configured to fit over said container threaded necked opening by having a set of threads configured to mate with said container threaded necked opening, said container being formed from a metal or a plastic material and said closure being formed from a plastic material.

35. A container closure comprising a head having a body configured to fit over a necked opening of a container in sealing relationship, a valve actuating means in said body, means on said body for operative engagement of said valve actuating means, said body being configured to fit over the necked opening of the container by having a pair of flanges configured to extend along an inside surface of the container necked opening, an outside surface of the container necked opening, said means for operative engagement of said valve actuating means engaging said valve actuating means such that application of force on said means for operative engagement of said valve actuating means moves said valve actuating means downward and a syphon tube extending downward from an interior surface of said body below said valve actuating means, said valve actuating means having a lower end extending through an opening in a top of said syphon tube, said valve actuating means lower end having a tip deformable to pass through the opening in said syphon tube top during assembly and being configured for sealing engagement with a lower surface of said syphon tube top.

36. A container closure comprising a head having a body configured to fit over a necked opening of a container in sealing relationship, a valve actuating means in said body, means on said body for operative engagement of said valve actuating means, said body being configured to fit over the necked opening of the container by having a pair of flanges configured to extend along an inside surface of the container necked opening and an outside surface of the container necked opening, said means for operative engagement of said valve actuating means engaging said valve actuating means such that application of force on said means for operative engagement of said valve actuating means moves said valve actuating means upward and a syphon tube extending downward below said value actuating means, said valve actuating means having a lower end with a tip configured to engage an opening in a top of said syphon tube in sealing engagement.

* * * * *